(12) United States Patent
Yoo et al.

(10) Patent No.: US 8,299,175 B2
(45) Date of Patent: Oct. 30, 2012

(54) METHOD OF PREPARING THERMOPLASTIC RESIN HAVING SUPERIOR GLOSS, IMPACT STRENGTH AND WHITENESS

(75) Inventors: Keun-hoon Yoo, Seoul (KR);
Chan-hong Lee, Daejeon (KR);
Jin-hyoung Lee, Gyeongsangbuk-do (KR); Joo-byung Chai, Jeollanam-do (KR); Yu-sung Jung, Jeollanam-do (KR); Bong-keun Ahn, Jeollanam-do (KR); Won-deok Han, Jeollanam-do (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/290,924

(22) Filed: Nov. 5, 2008

(65) Prior Publication Data
US 2009/0118393 A1    May 7, 2009

(30) Foreign Application Priority Data

Nov. 7, 2007   (KR) .................. 10-2007-0113050

(51) Int. Cl.
*C08G 63/48* (2006.01)
*C08F 297/02* (2006.01)
*C08F 290/04* (2006.01)

(52) U.S. Cl. .......... 525/70; 525/242; 525/243; 524/504; 524/560; 524/565; 524/571

(58) Field of Classification Search .................. 525/271, 525/69–71, 77–78, 83–84, 233–234, 242–243; 524/230, 233–234, 458, 460, 504, 560, 565, 524/555–556; 523/335

See application file for complete search history.

(56) References Cited

U.S. PATENT DOCUMENTS

| | | | |
|---|---|---|---|
| 3,928,494 A | 12/1975 | Aliberti | |
| 4,520,165 A | 5/1985 | Zabrocki et al. | |
| 5,910,538 A * | 6/1999 | Padwa et al. | 525/67 |
| 5,955,540 A | 9/1999 | Dion et al. | |
| 6,384,129 B1 * | 5/2002 | Lowry | 524/534 |
| 6,774,182 B2 * | 8/2004 | Yoo et al. | 525/70 |
| 6,906,134 B2 * | 6/2005 | Chai et al. | 525/64 |
| 7,064,149 B2 * | 6/2006 | Lee et al. | 516/53 |
| 2005/0239962 A1 * | 10/2005 | Yoo et al. | 525/71 |
| 2006/0089462 A1 * | 4/2006 | O et al. | 525/242 |
| 2006/0167179 A1 * | 7/2006 | Lee et al. | 525/70 |
| 2007/0078221 A1 * | 4/2007 | Choi et al. | 525/70 |
| 2007/0123648 A1 * | 5/2007 | Lee et al. | 525/70 |
| 2007/0123657 A1 * | 5/2007 | Chai et al. | 525/242 |

FOREIGN PATENT DOCUMENTS

EP    0 288 298    10/1998

OTHER PUBLICATIONS

Machine Translation of JP 2003-206304.*

* cited by examiner

*Primary Examiner* — Vasu Jagannathan
*Assistant Examiner* — Hannah Pak
(74) *Attorney, Agent, or Firm* — Lerner, David, Littenberg, Krumholz & Mentlik, LLP

(57) ABSTRACT

Disclosed is a method for preparing a thermoplastic resin with superior impact resistance, chemical resistance and processability as well as excellent gloss and whiteness. The method includes emulsion-polymerizing a conjugated diene compound monomer to prepare a rubber latex having an average particle diameter of 1,800 Å to 5,000 Å, a polymerization conversion ratio of at least 90% and a swelling index of 12 to 40, an average gel content of 70 to 95%, emulsion-polymerizing 45 to 75 parts by weight of the rubber latex with 17 to 40 parts by weight of an aromatic vinyl compound and 4 to 20 parts by weight of a vinyl cyanide compound to prepare a graft copolymer latex, and coagulating the graft copolymer latex with a coagulant at 60 to 80° C., and aging the graft copolymer latex at 80 to 99° C. to obtain a graft copolymer powder.

20 Claims, No Drawings

METHOD OF PREPARING THERMOPLASTIC RESIN HAVING SUPERIOR GLOSS, IMPACT STRENGTH AND WHITENESS

CROSS-REFERENCE TO RELATED APPLICATION

This application claims the benefit of the filing date of Korean Patent Application No. 10-2007-0113050 filed on Nov. 7, 2007 in the Korean Intellectual Property Office, the disclosure of which is incorporated herein in its entirety by reference.

FIELD OF THE INVENTION

The present invention relates to a method for preparing a thermoplastic resin with superior impact resistance, chemical resistance and processability as well as excellent gloss and whiteness. More particularly, the present invention relates to a method for preparing a thermoplastic resin, by graft-copolymerizing an aromatic vinyl compound and a vinyl cyanide compound onto a rubber latex obtained by polymerizing conjugated diene compound monomers. The thermoplastic resin thus prepared is used as a mixture of the graft copolymer and a styrene-acrylonitrile (SAN) copolymer generally prepared by bulk polymerization.

BACKGROUND OF THE INVENTION

An acrylonitrile-butadiene-styrene copolymer (hereinafter, referred to as an "ABS resin") thermoplastic resin is a material widely used in office appliances, electronic/electrical components, automobile interior materials and the like, due to its superior physical properties such as impact resistance, chemical resistance and processability. Methods for preparing such a resin are disclosed in U.S. Pat. Nos. 3,928,494, 4,520,165, 5,955,540, and 5,910,538 and European Patent Publication No. 0288298A and the like. These patents suggest techniques to improve physical properties such as impact strength, processability and gloss, but do not teach a technique associated with a thermoplastic ABS resin that exhibits excellent gloss as well as superior whiteness.

ABS resins are predominantly prepared by emulsion polymerization and are sometimes prepared by bulk polymerization. In accordance with the emulsion polymerization, a diene rubber latex is initially prepared by emulsion polymerization to impart impact strength, aromatic vinyl compound monomers and vinyl cyanide compound monomers are grafted to the rubber latex to prepare an acrylonitrile-butadiene-styrene copolymer, and the graft copolymer is then mixed with a styrene-acrylonitrile (hereinafter, referred to as a "SAN") copolymer prepared by bulk polymerization to prepare a final ABS resin. The ABS resin prepared by this method exhibits superior impact resistance, processability and chemical resistance, but disadvantageously has a limitation of physical properties such as whiteness and thermal stability as well as of some loss due to the use of emulsifiers and coagulants. Meanwhile, the ABS resin prepared by bulk polymerization contains no emulsifier and thus exhibits superior whiteness and thermal stability. However, the ABS resin disadvantageously has a limitation of gloss due to use of large-diameter rubbers, and of physical properties such as impact resistance since it cannot contain rubbers in a predetermined amount or higher due to viscosity thereof.

SUMMARY OF THE INVENTION

Therefore, the present invention has been made in view of the above problems, and it is an object of the present invention to provide a method for preparing a thermoplastic ABS resin with superior impact resistance, chemical resistance and processability as well as excellent gloss and whiteness.

In accordance with the present invention, the above and other objects can be accomplished by the provision of a method for preparing a thermoplastic resin including: emulsion-polymerizing a conjugated diene compound monomer to prepare a rubber latex having an average particle diameter of 1,800 Å to 5,000 Å, a polymerization conversion ratio of at least 90% and a swelling index of 12 to 40, an average gel content of 70 to 95%; emulsion-polymerizing 45 to 75 parts by weight of the rubber latex with 17 to 40 parts by weight of an aromatic vinyl compound and 4 to 20 parts by weight of a vinyl cyanide compound to prepare a graft copolymer latex; and coagulating the graft copolymer latex with an coagulant at 60 to 80° C., followed by aging at 80 to 99° C., to obtain a graft copolymer powder.

The coagulation may be carried out by adding sulfuric acid, an aqueous magnesium sulfate solution, or a mixture thereof to the graft copolymer latex.

Preferably, the graft copolymer powder may have a bulk density ranging from 0.3 to 0.55.

The step of preparing the rubber latex may include: introducing 50 to 95 parts by weight of the conjugated diene compound monomer, out of a total of 100 parts by weight thereof, together with a molecular weight controlling agent to perform a primary reaction; and introducing the remaining content of the conjugated diene compound monomer together with the molecular weight controlling agent to perform a secondary reaction, wherein a ratio of the conjugated diene compound monomer to the molecular weight controlling agent used in the secondary reaction is higher than that used in the primary reaction, and a reaction time of the secondary reaction is longer than that of the primary reaction.

More preferably, the primary reaction may be carried out by simultaneously introducing 50 to 95 parts by weight of the conjugated diene compound monomer, out of a total of 100 parts by weight thereof, 1 to 4 parts by weight of an emulsifier, 0.2 to 1.5 parts by weight of a polymerization initiator, 0.1 to 0.5 parts by weight of an electrolyte, 0.1 to 0.5 parts by weight of a molecular weight controlling agent, and 75 parts by weight of ion exchanged water, following by reacting at 60 to 75° C. for 8 to 25 hours, and the secondary reaction may be carried out by simultaneously, continuously or sequentially introducing the remaining content of the conjugated diene compound monomer and 0.1 to 0.3 parts by weight of a molecular weight controlling agent, followed by reacting at 70 to 85° C. for 15 to 40 hours.

The step of preparing the graft copolymer latex may include: continuously or intermittently adding 0.1 to 0.5 parts by weight of an oil-soluble initiator, 11 to 25 parts by weight of an aromatic vinyl compound and 3 to 16 parts by weight of a vinyl cyanide compound, to 45 to 75 parts by weight of the rubber latex, to perform primary graft polymerization; and continuously or intermittently adding 6 to 15 parts by weight of an aromatic vinyl compound and 1 to 4 parts by weight of a vinyl cyanide compound to the primary graft polymer, to perform secondary graft polymerization.

The graft copolymer powder thus obtained may be mixed with a styrene-acrylonitrile (SAN) copolymer generally prepared by bulk polymerization to form a thermoplastic resin.

DETAILED DESCRIPTION OF THE INVENTION

Hereinafter, the present invention will be described in detail.

The method for preparing a thermoplastic resin according to the present invention comprises preparing a rubber latex, grafting an aromatic vinyl compound and a vinyl cyanide compound to the rubber latex to obtain a graft copolymer, and applying a coagulant to the graft copolymer to obtain a graft copolymer powder.

In order to impart improved gloss and impact resistance to final resin products, the preparation process of the rubber latex is controlled such that latex particles have different internal and external gel contents, and suitable gel contents and diameter. Furthermore, in the step of preparing the graft copolymer latex (e.g., acrylonitrile-butadiene-styrene graft copolymer latex) by grafting the aromatic vinyl compound and vinyl cyanide compound monomers onto the rubber latex, in order to impart improved whiteness to final resin products, the rubber content is increased, an oil-soluble polymerization initiator is used, and a ratio of the aromatic vinyl compound monomer and the vinyl cyanide compound monomer introduced in initial and final stages is varied. The coagulation of the rubber-rich graft copolymer latex thus obtained is carried out by suitably controlling the coagulant and coagulation conditions to obtain a graft copolymer powder with improved powder properties.

The graft copolymer powder thus obtained is free from the risk of fire occurring upon drying and the problem of deteriorated extrusion efficiency due to particle clumping upon extrusion. General rubber-rich copolymer latexes suffer from the risk of fire occurring upon the coagulation and drying process, and improvement in powder properties thereof is inevitably thus required to prepare the same. The graft copolymer thus prepared is mixed with a styrene-acrylonitrile copolymer prepared by bulk polymerization, to obtain a thermoplastic ABS resin with superior physical properties.

The method of the present invention employs emulsion-polymerization to prepare a thermoplastic resin, in particular, a thermoplastic ABS resin, with superior gloss, whiteness and thermal stability. A more detailed explanation of the respective steps of the method according to the present invention will be provided below.

Preparation of Rubber Latex

In order to impart high impact strength to final resin products, a particle diameter and gel content of the rubber latex are very important when preparing the same.

When the particle diameter of rubber latex is large, the final resin thus obtained exhibits superior impact strength, but disadvantageously has bad gloss due to a decreased graft ratio. On the other hand, when the particle diameter of rubber latex is small, the final resin thus obtained exhibits excellent gloss, but disadvantageously exhibits deteriorated impact strength. In addition, in the case where the content of gel present in the rubber latex is high, for example, when styrene and acrylonitrile are grafted to the rubber latex, only a small amount of styrene-acrylonitrile compound is swollen in rubber particles, thus resulting in excellent gloss, but disadvantageously deteriorated impact resistance. Accordingly, it is important that the rubber latex contain a suitable amount of gel.

In order to allow internal and external gel contents of the rubber latex to differ from each other, the method of the present invention employs two-step polymerization wherein the conjugated diene monomer is introduced portionwise together with a molecular weight controlling agent, adopts a suitable emulsifier and electrolyte to control the particle diameter and adjusts the reaction temperature to a desired level. That is, the conjugated diene compound introduced in the initial step is inside the latex and its gel content gradually increases as the reaction proceeds, thus making the gel content inside latex particles high, whereas the conjugated diene compound introduced in the secondary step is concentrated outside the latex and takes a short time to cross-link, as compared to the initial step, thus making the content of gel present outside the latex relatively low.

In addition, in view of economical efficiency of productivity, it is preferable to make a polymerization conversion ratio of the rubber latex as high as possible. However, as the polymerization conversion ratio increases, the gel content slowly increases due to the cross-linking reaction of double bonds present in the diene rubber and then disadvantageously rapidly elevates when the conversion ratio reaches a predetermined level or higher, thus casing deterioration in impact strength. This problem makes it difficult to continue the reaction until the conversion ratio reaches a high level, e.g., at least 93%, in particular, at least 95%. However, the present invention can ensure superior impact strength even at such a high conversion ratio by controlling the gel content through control over the introduction time and method of the molecular weight controlling agent.

That is, in the step of preparing the rubber latex, with respect to 100 parts by weight of a conjugated diene compound monomer, 50 to 95 parts by weight thereof is introduced together with a predetermined amount of molecular weight controlling agent to proceed a primary reaction, and the remaining content of the monomer is then introduced together with the molecular weight controlling agent to proceed a secondary reaction. The amount of the molecular weight controlling agent introduced with respect to the conjugated diene compound monomer in the second step is higher than the amount of molecular weight controlling agent introduced in the first step. For example, when, in the first reaction step, 80 parts by weight of 1,3-butadiene is introduced together with 0.3 parts by weight of the molecular weight controlling agent, in the second reaction step, 20 parts by weight of the 1,3-butadiene may be introduced together with 0.1 parts by weight of the molecular weight controlling agent. At this time, in the first reaction step, a ratio of the amount of molecular weight controlling agent introduced to the amount of 1,3-butadiene introduced is 0.3/80=0.375 wt %, whereas in the second reaction, a ratio of the amount of molecular weight controlling agent introduced to the amount of 1,3-butadiene introduced 0.1/20=0.5 wt %. That is, the ratio of molecular weight controlling agent to the 1,3-butadiene, of the second reaction step, is higher than that of the first reaction step. Furthermore, it is preferable that the reaction time of the second reaction be longer than that of the first reaction. These reaction conditions enable realization of a desired gel content, e.g., at least 88%, in particular, at least 90%, at a high polymerization conversion ratio, e.g. at least 93%, in particular, at least 95%. The 90% gel content at the 95% polymerization conversion ratio, which cannot be obtained by conventional methods, can be accomplished by control over process conditions according to exemplary embodiments of the present invention.

In the step of preparing the rubber latex, the primarily added conjugated diene compound may be continuously or sequentially introduced, but may be preferably simultaneously introduced, whereas the secondarily added conjugated diene compound may be simultaneously, continuously or sequentially introduced.

More specifically, according to the present invention, the rubber latex that has an average particle diameter of 1,800 Å to 5,000 Å and different internal and external gel contents is obtained by simultaneously introducing 50 to 95 parts by weight of a conjugated diene compound monomer, out of a total of 100 parts by weight thereof, 1 to 4 parts by weight of an emulsifier, 0.2 to 1.5 parts by weight of a polymerization initiator, 0.1 to 0.5 parts by weight of an electrolyte, 0.1 to 0.5 parts by weight of a molecular weight controlling agent and 75 parts by weight of ion exchanged water, reacting the mixture at 60° C. to 75° C. for 8 to 25 hours, simultaneously or continuously (sequentially) adding the remaining content of the conjugated diene compound monomer and 0.1 to 0.3 parts by weight of a molecular weight controlling agent thereto, and reacting the resulting mixture at 70° C. to 85° C. for 15 to 35 hours. The latex has a polymerization conversion ratio of at least 90%, a swelling index of 12 to 40, and an average gel content of 70 to 95%.

The monomer used in the present invention may be a conjugated diene compound (preferably, an aliphatic conjugated diene compound) alone, or a combination thereof with an ethylene-based unsaturated compound that can be copolymerized with the conjugated diene compound. Examples of the ethylene-based unsaturated compound include aromatic vinyl compounds such as styrene, α-methylstyrene, o-ethylstyrene, p-ethylstyrene and vinyl toluene, and vinyl cyanide compounds such as acrylonitrile, methacrylonitrile and ethacrylonitrile. Preferably, the monomer copolymerizable with the conjugated diene compound may be used in an amount not more than 20 parts by weight, with respect to 100 parts by weight of the monomer mixture.

Examples of useful conjugated diene compounds include 1,3-butadiene, isoprene, chloroprene, piperylene and comonomers thereof.

Examples of useful emulsifiers include alkylaryl sulfonate, alkali metal alkyl sulfate, sulfonated alkylester, fatty acid soaps, alkali metal rosinates and the like. The emulsifier may be used alone or as a mixture of two or more thereof.

The polymerization initiator may be a water-soluble persulfate or peroxy compound, or a redox system. The most useful water-soluble persulfates are sodium and potassium persulfates. Examples of useful oil-soluble polymerization initiators include cumene hydroperoxide, diisopropylbenzene hydroperoxide, azobisisobutyronitrile, tert-butyl hydroperoxide, p-methane hydroperoxide, benzoylperoxide and mixtures of two or more thereof. The polymerization initiator may be used as a mixture of water-soluble and oil-soluble polymerization initiators.

Examples of useful electrolytes include KCl, NaCl, $KHCO_3$, $NaHCO_3$, $K_2CO_3$, $Na_2CO_3$, $KHSO_3$, $NaHSO_3$, $K_4P_2O_7$, $Na_4P_2O_7$, $K_3PO_4$, $Na_3PO_4$, $K_2HPO_4$, $Na_2HPO_4$ and mixtures thereof.

As the molecular weight controlling agent, mercaptan is generally used and tert-dodecylmercaptan is particularly preferable.

The polymerization temperature is important in adjusting the gel content and swelling level of the rubber latex to a desired level, and must be determined taking into consideration selection of the polymerization initiator. In addition, the content and introduction time of the molecular weight controlling agent are very important to control the gel content. In this regard, the gel content of the rubber latex slowly increases as the polymerization conversion ratio increases, and then rapidly increases in the final polymerization stage. As described above, the present invention employs the molecular weight controlling agent to control the gel content and also uses the same in a suitable amount in the final reaction state.

Preferably, the average particle diameter of rubber latex suited to obtain a thermoplastic ABS resin with superior impact resistance ranges from 1,800 Å to 5,000 Å and its standard deviation is up to 25%. In addition, the rubber latex preferably has a total gel content of 70 to 95% and a swelling index of about 12 to about 40. When the average particle diameter of the rubber latex is 1,800 Å or less, impact resistance is deteriorated, and when the average particle diameter of the rubber latex is 5,000 Å or higher, the latex stability of the polymer is deteriorated upon preparing the ABS graft copolymer, causing formation of a large amount of solids and deterioration in the gloss.

The rubber latex was analyzed in the following manner.

a) Gel content and swelling index

The rubber latex was solidified with diluted acid or a metal salt, washed and then dried in a vacuum oven at 60° C. for 24 hours. The resulting rubber mass was cut into fragments with a scissors. 1 g of the rubber fragments was added to 100 g of toluene. The mixture was stored in a darkroom at ambient temperature for 48 hours and separated into a sol and a gel. The gel content and swelling index of the rubber latex were calculated by the following Equations:

Gel content (%)=weight of insoluble gel ($g$)/weight of sample ($g$)*100

Swelling index=weight of swollen gel ($g$)/weight of normal gel ($g$)

b) Particle diameter and distribution

The particle diameter and distribution of the rubber latex were measured by a dynamic laser light scattering method using Nicomp 370 HPL (available form NICOMP Co., USA).

c) Solid content (%)=weight of solid produced in a reaction bath/total weight of monomers added*100

Preparation of Graft Copolymer Latex

The rubber content of rubber latex used for preparation of the graft copolymer is a very important factor in view of whiteness, gloss, thermal stability, and the like. When the rubber content is low, the aromatic vinyl compound and the vinyl cyanide compound are used in relatively large amounts and thus grafted in large quantities to the latex, thus imparting excellent gloss to a final thermoplastic ABS resin, but disadvantageously imparting deteriorated whiteness and thermal stability thereto, since the ABS resin contains a large amount of emulsifier when prepared by mixing the graft copolymer with a general SAN. When the rubber content is excessively high, the aromatic vinyl compound and the vinyl cyanide compound are present in relatively low amounts and are thus insufficiently grafted to the latex, thus disadvantageously causing deterioration in gloss. As the rubber content increases, a graft ratio becomes more important. Large amounts of aromatic vinyl compound and vinyl cyanide compound must be bound to the rubber (i.e., a graft ratio must be not less than a predetermined level) in order to secure superior physical properties such as thermal stability, dryness and impact strength. When large amounts of aromatic vinyl compound and vinyl cyanide compound are not bound to the rubber, thus leading to formation of a great amount of unbound copolymers, many problems occur upon drying and the resin has limited thermal stability and impact strength. Accordingly, the use of an oil-soluble initiator is required to bind a great amount of the aromatic vinyl compound and the vinyl cyanide compound to the rubber. The term "oil-soluble initiator" as used herein refers to an initiator soluble in an organic solvent or a fatty component, which is also called a "fat-soluble initiator".

Furthermore, a reactant introduction technique is also a very important factor. When the aromatic vinyl compound and the vinyl cyanide compound are continuously added in a predetermined ratio, as the reaction proceeds, based on the difference in reactivity between the two components, the acrylonitrile component gradually increases and an acrylonitrile compound-rich graft copolymer is thus obtained, thus disadvantageously causing deterioration in whiteness. When the rubber content of the graft copolymer increases for the purpose of improving whiteness, there occur various problems including deterioration in latex stability, the risk of fire occurring upon drying of coagulated particles, deterioration in powder properties of the particles and thus several problems associated with extrusion.

In the present invention, the graft copolymer is prepared by varying a mix ratio of the grafted aromatic vinyl compound monomer and the vinyl cyanide compound monomer as well as addition method of the monomers, while making an amount of the rubber used as high as possible (realization of rubber-rich copolymer) to improve whiteness, and by using the oil-soluble initiator whiteness upon grafting.

Accordingly, to prepare the graft copolymer latex of the present invention, 45 to 75 parts by weight of the rubber latex prepared as described above is graft-copolymerized with 17 to 40 parts by weight of an aromatic vinyl compound, 4 to 20 parts by weight of a vinyl cyanide compound, 0.2 to 0.6 parts by weight of an emulsifier, 0.1 to 0.4 parts by weight of a molecular weight controlling agent, and 0.1 to 0.5 parts by weight of an oil-soluble polymerization initiator.

Preferably, the polymerization temperature is 45 to 80° C. and polymerization time is 3 to 6 hours. Methods for adding respective components in the graft-polymerization may include simultaneous addition, multi-step separation addition, continuous addition, and addition by control of an addition ratio between the respective components, while considering a reactivity ratio therebetween. Of these, multi-step separation addition or continuous addition is preferred in order to improve the graft ratio and minimize formation of solids.

In particular, the latex contains a great amount of acrylonitrile and may have a limitation of whiteness improvement. To overcome the limitation, there is a need for a method wherein the acrylonitrile component has low reactivity, as compared to styrene, is added in a higher amount in the initial reaction step and is then added in a lower amount in the secondary reaction step. More specifically, 11 to 25 parts by weight of an aromatic vinyl compound and 3 to 16 parts by weight of a vinyl cyanide compound are continuously or intermittently added to 45 to 75 parts by weight of the rubber latex to perform primary graft polymerization, and 6 to 15 parts by weight of the aromatic vinyl compound and 1 to 4 parts by weight of the vinyl cyanide compound are then continuously or intermittently added to the primary graft polymer to perform secondary graft polymerization, thereby preparing the graft copolymer latex. That is, for a mix ratio of the aromatic vinyl compound to the vinyl cyanide compound, the primary polymerization must be lower than the secondary polymerization, to obtain a final latex product with superior whiteness.

Examples of the emulsifier that can be used in the polymerization include alkylaryl sulfonate, alkali metal alkyl sulfate, sulfonated alkylester, fatty acid soaps, alkali metal rosinate and the like. The emulsifier may be used alone or as a mixture of two or more thereof.

The selection of emulsifier is very important to secure latex stability when preparing rubber-rich graft copolymers.

As the molecular weight controlling agent, mercaptan is generally used and tert-dodecylmercaptan is particularly preferable.

Examples of useful oil-soluble polymerization initiators include redox catalyst systems composed of peroxides such as cumene hydroperoxide, diisopropylbenzene hydroperoxide, tert-butyl hydroperoxide or p-methane hydroperoxide, and reducing agents such as benzoylperoxide, sodium formaldehyde sulfoxylate, sodium ethylenediaminetetraacetate, ferrous sulfate, dextrose, sodium pyrrolinate or sodium sulfite. In addition, the polymerization initiator may be an organic compound such as azobisisobutyronitrile.

The polymerization conversion ratio of the latex obtained after completion of the polymerization is at least 96%. The stability of the graft copolymer latex was evaluated from the solid content (%) calculated according to Equations 1 below:

$$\text{Solid content (\%)} = \text{weight of solids produced in a reaction bath } (g)/\text{total weight of rubber and monomers } (g) \times 100 \quad (1)$$

Preferably, the solid content measured after completion of the polymerization is 0.7% or less.

When the solid content is 0.7% or higher, the latex stability is excessively deteriorated and the desired graft polymer cannot be obtained due to the large amount of solid.

In addition, a graft ratio of the graft polymer is measured in the following manner. The graft polymer latex is coagulated, washed and dried to obtain a latex power. 2 g of the powder is added to 300 Mℓ of acetone and stirred for 24 hours. The resulting solution is separated with an ultracentrifuge and added dropwise to methanol to obtain a non-grafted fraction. The non-graft fraction is dried and then weighted. The graft ratio is calculated from the weight according to Equation 2 below:

$$\text{Graft ratio (\%)} = \{\text{weight of grafted monomer } (g)\}/\{\text{weight of rubber } (g)\} \times 100 \quad (2)$$

When the graft ratio is 25% or less, deterioration in gloss disadvantageously occurs.

Coagulation of Graft Copolymer Latex

The graft copolymer latex is coagulated by a coagulant to produce a graft copolymer powder. At this time, a graft copolymer powder with superior powder properties can be obtained by coagulating the graft copolymer latex at a coagulation temperature of 60° C. to 80° C. and aging the same at an aging temperature of 80° C. to 99° C., and dehydrating the resulting slurry, followed by drying. When the coagulation temperature is excessively low, there occur problems including bad particle diameter distribution, low coagulation efficiency, deteriorated thermal stability upon drying and thus the risk of fire occurring. Meanwhile, when the coagulation temperature is excessively high, powder particles lump together, thus making it impossible to dry, or although possible, occurring defective extrusion. An additive such as an antioxidant may be added to the graft copolymer latex. The coagulant may be an aqueous sulfuric acid solution, a magnesium sulfate aqueous solution or a mixture thereof. The amount of coagulant used may be suitably determined depending on concentration of coagulant, amount of coagulant medium, type of latex solution medium and amount of medium used, and may be 1 to 5 parts by weight, based on the weight of coagulant. An about 10% aqueous coagulant solution is commonly used. Other examples of the coagulant include well-known coagulants such as $CaCl_2$ and $Al_2(SO_4)_3$.

As apparent from the description, the method of the present invention comprises sequentially performing coagulation and aging processes at suitable temperatures, thereby obtaining a graft copolymer powder that contains a great amount of rubber and has a high (e.g., 0.30 to 0.55) bulk density, enabling prevention of the risk of fire occurring upon drying and the problem of deteriorated extrusion efficiency due to particle clumping during extrusion.

Mixing

The graft copolymer powder thus obtained was mixed with a general styrene-acrylonitrile (SAN) copolymer prepared by bulk polymerization to prepare a thermoplastic resin with superior impact resistance, chemical resistance and formability as well as excellent gloss and whiteness.

For example, a general SAN (available from LG. Chem, Ltd., Grade: 80 HF, prepared by bulk polymerization), a lubricant, an antioxidant and a light stabilizer were introduced to the ABS graft copolymer thus prepared and homogeneously mixed at 200 to 210° C. using a 2-shaft extrusion kneader to prepare a pellet, thereby obtaining a final ABS resin which can be used for the intended purposes.

In order to prepare an ABS resin with superior whiteness, a large amount of emulsifier-free general SAN must be used. To accomplish this purpose, a great amount of general SAN must be contained in a predetermined content of rubber in final resin products by using a large amount of rubber in the preparation of the ABS graft polymer.

The present invention will now be described in further detail with reference to the following Examples and Comparative Examples. These examples are for illustrative purposes only and are not intended to limit the scope of the present invention.

EXAMPLES

Example 1

Preparation of Rubber Latex 75 parts by weight of ion exchanged water, 80 parts by weight of 1,3-butadiene as a monomer, 1.2 parts by weight of potassium rosinate as an emulsifier, 1.5 parts by weight of potassium oleate, 0.7 parts by weight of sodium carbonate ($Na_2CO_3$) and 0.8 parts by weight of potassium bicarbonate ($KHCO_3$) as electrolytes, 0.3 parts by weight of tert-dodecyl mercaptan (TDDM) as a molecular weight controlling agent, and 0.3 parts by weight of potassium persulfate as a polymerization initiator were simultaneously introduced to a polymerization reactor (autoclave) purged with nitrogen and then reacted at 68° C. for 13 hours and 20 parts by weight of the remaining monomer 1,3-butadiene and 0.1 parts by weight of tert-dodecyl mercaptan were simultaneously introduced to the polymerization reactor to react 75° C. for 35 hours. The resulting rubber latex was analyzed.

The rubber latex had a polymerization conversion ratio of 95%, a particle diameter of 2,700 Å, a gel content of 90% and a swelling index of 16.

The gel content, swelling index and particle diameter of the rubber latex were measured in the following manner.

[Gel Content and Swelling Index]

The rubber latex is solidified with diluted acid or a metal salt, washed and then dried in a vacuum oven at 60° C. for 24 hours. The resulting rubber mass is cut into fragments with scissors. 1 g of the rubber fragments is added to 100 g of toluene. The mixture is stored in a darkroom at ambient temperature for 48 hours and separated into a sol and a gel. The gel content and swelling index of the rubber latex were calculated by Equations 3 and 4 below:

Gel content (%)=weight of insoluble gel (g)/weight of sample (g)*100     (3)

Swelling index=weight of swollen gel (g)/weight of normal gel (g)     (4)

The particle diameter of the rubber latex was measured by a dynamic laser light scattering method using Nicomp 370 HPL (available form NICOMP Co., USA).

(Preparation of Graft Copolymer)

60 parts by weight of the rubber latex thus prepared, 65 parts by weight of ion exchanged water, 0.35 parts by weight of potassium rosinate as an emulsifier, 0.1 parts by weight of sodium ethylenediaminetetraacetate, 0.005 parts by weight of ferrous sulfate, and 0.23 parts by weight of formaldehyde sodium sulfoxylate were simultaneously introduced to a polymerization reactor purged with nitrogen and then reacted while elevating to a temperature of 70° C. In addition, an emulsion mixture consisting of 40 parts by weight of ion exchanged water, 0.5 parts by weight of potassium rosinate, 19.2 parts by weight of styrene, 8.2 parts by weight of acrylonitrile, 0.3 parts by weight of t-dodecyl mercaptan, and 0.3 parts by weight of diisopropylenehydroperoxide were continuously added thereto for 2 hours, an emulsion mixture consisting of 10 parts by weight of ion exchanged water, 0.1 parts by weight of potassium rosinate, 9.6 parts by weight of styrene, 3.0 parts by weight of acrylonitrile, 0.1 parts by weight of t-dodecyl mercaptan, and 0.1 parts by weight of diisopropylenehydroperoxide was continuously added thereto for one hour, reacted while elevating to 80° C. and then further aged for one hour to complete the reaction.

At this time, a polymerization conversion ratio was 97.5 wt %, a solid content was 0.2%, and a graft ratio was 40%.

Furthermore, this latex was coagulated with 1.2 parts by weight of an aqueous solution of sulfuric acid and magnesium sulfate at 71° C., aged at 90° C., dehydrated, washed and dried to obtain a powder. Due to high bulk density of about 0.43, the powder was free of problems associated with drying and was not coagulated upon extrusion. Such a bulk density cannot be obtained from the conventional methods, based on 60 parts by weight of the rubber latex.

(Mixing)

0.5 parts by weight of a lubricant, 0.3 parts by weight of an antioxidant and 0.1 parts by weight of a light stabilizer were added to 30 parts by weight of the graft copolymer prepared above and 70 parts by weight of a general SAN (Grade: 80 HF), homogeneously mixed and then pelletized at 200° C. with a twin screw extruder. The resulting pellet was injection-molded to obtain a sample. The physical properties of the sample were measured. The results thus obtained are shown in Table 1.

General physical properties were measured according to an ASTM method, and whiteness was measured with a Hunter lab color meter (available from Hunter Lab. USA) and then compared with others.

Comparative Example 1

An ABS graft copolymer was prepared in the same manner as Example 1, except that the amount of the rubber latex used in the preparation of the graft copolymer was 76 parts by weight instead of 60 parts by weight, and the amounts of styrene and acrylonitrile used in the first step were 8.2 parts by weight and 4.2 parts by weight, instead of 19.2 parts by weight and 8.2 parts by weight, respectively. At this time, a graft ratio was 24%.

(Mixing)

The mixing process was carried out in the same manner as in Example 1, except that the amounts of the graft copolymer and the general SAN were 25 parts by weight and 75 parts by weight, instead of 30 parts by weight and 70 parts by weight, respectively.

The physical properties of the samples were compared and the results thus obtained are shown in Table 1.

The comparison results show that Comparison Example 1 exhibits deteriorated gloss due to the low graft ratio.

Comparative Example 2

An ABS graft copolymer was prepared in the same manner as Example 1, except that the amount of the rubber latex used in the preparation of the graft copolymer was 40 parts by weight instead of 60 parts by weight, and the amounts of styrene and acrylonitrile used in the first step were 33.2 parts by weight and 14.2 parts by weight, instead of 19.2 parts by weight and 8.2 parts by weight, respectively. At this time, a graft ratio was 50%.

In addition, the mixing process was carried out in the same manner as in Example 1, except that the graft copolymer and the general SAN were used in amounts of 55 parts by weight and 55 parts by weight, instead of 30 parts by weight and 70 parts by weight, respectively. The physical properties of the samples were compared and the results thus obtained are shown in Table 1.

The comparison results show that since the graft copolymer of Comparison Example 2 contains a small amount of rubber, a final ABS resin contains a great amount of graft copolymer prepared by emulsion polymerization, thus causing deterioration in whiteness due to the emulsifier and the coagulant.

Comparative Example 3

An ABS graft copolymer was prepared in the same manner as Example 1, except that in the preparation step of the graft copolymer, the reaction was performed for 3 hours, while continuously introducing a mixture of the styrene and acrylonitrile compounds at a constant ratio, instead of introducing the compounds in the two steps. The physical properties of the sample were compared with others, and the results thus obtained are shown in Table 1.

The comparison results show that the graft copolymer containing a relatively great amount of acrylonitrile was prepared in the final state, thus disadvantageously limiting whiteness improvement.

Comparative Example 4

An ABS graft copolymer was prepared in the same manner as Example 1, except that 60 parts by weight of a small-particle diameter rubber latex prepared according to the following method was used instead of 60 parts by weight of the rubber latex used in Example 1.

(Preparation of Small-Particle Diameter Rubber Latex)

100 parts by weight of ion exchanged water, 100 parts by weight of 1,3-butadiene as a monomer, 1.2 parts by weight of potassium rosinate as an emulsifier, 1.5 parts by weight of potassium oleate, 0.1 parts by weight of sodium carbonate ($Na_2CO_3$) and 0.5 parts by weight of potassium bicarbonate ($KHCO_3$) as electrolytes, and 0.3 parts by weight of tert-dodecyl mercaptan (TDDM) as a molecular weight controlling agent were simultaneously added to a polymerization reactor purged with nitrogen, the reaction temperature was elevated to 55° C., and the reaction was initiated by addition of 0.3 parts by weight of potassium persulfate as a polymerization initiator. The reaction was allowed to proceed for 10 hours. Then, 0.05 parts by weight of tert-dodecyl mercaptan was further added to the reaction mixture and the reaction was then continued at 65° C. for 8 hours to obtain a small-particle diameter rubber latex.

The small-particle diameter rubber latex thus obtained had a particle diameter of 1,000 Å, a gel content of 89%, and a swelling index of 18.

The physical properties of the sample were compared with others and the results thus obtained are shown in Table 1.

The comparison results show that the rubber latex had a small particle diameter, thus disadvantageously limiting impact strength.

Comparative Example 5

An ABS graft copolymer was prepared in the same manner as Example 1, except that in the preparation process of the rubber latex, a polymer coagulant was added at 20 hours to prepare an ultra large particle diameter rubber latex having a particle diameter of 5,100 Å, and in the preparation process of the graft ABS copolymer, 60 parts by weight of an ultra large particle diameter rubber latex was used, instead of 60 parts by weight of the large-particle diameter rubber latex. At this time, a graft ratio was 20%.

The physical properties of the sample were compared and the results thus obtained are shown in Table 1.

The comparison results show that the ABS resin exhibited deteriorated gloss due to the low graft ratio.

Comparative Example 6

An ABS graft copolymer was prepared in the same manner as Example 1, except that in the preparation step of the rubber latex, the amount of tert-dodecyl mercaptan primarily added was 0.6 parts by weight, instead of 0.3 parts by weight and the amount of tert-dodecyl mercaptan secondarily added was 0.3 parts by weight, instead of 0.1 parts by weight.

The rubber latex had a particle diameter of 2,750 Å and a gel content of 60%.

The physical properties of the sample were compared and the results thus obtained are shown in Table 1.

The comparison results show that the rubber latex had a low amount of gel, thus disadvantageously limiting gloss.

Comparative Example 7

An ABS graft copolymer was prepared in the same manner as Example 1, except that the graft copolymer prepared by bulk polymerization, instead of emulsion polymerization was used.

The ABS graft thus obtained contained 13% by weight of the rubber and was used without mixing with a general SAN.

The physical properties of the sample were compared and the results thus obtained are shown in Table 1.

The comparison results show that the sample had limited gloss and impact strength due to use of the ABS graft copolymer prepared by bulk polymerization.

Comparative Example 8

An ABS graft copolymer was prepared in the same manner as Example 1, except that the polymerization initiator used for preparing the graft copolymer was water-soluble persulfate, instead of oil-soluble diisopropylenehydroperoxide. The graft copolymer thus obtained had a graft ratio of about 20%, disadvantageously causing yellowing when dried.

Comparative Example 9

An ABS graft copolymer was prepared in the same manner as Example 1, except that the latex was coagulated at 55° C., aged at 75° C., dehydrated and dried to obtain a powder. At this time, the power had a low bulk density of 0.28 and its thermal stability was deteriorated when dried, thus disadvantageously causing the risk of fire occurrence during the preparation process.

Comparative Example 10

An ABS graft copolymer was prepared in the same manner as Example 1, except that the latex was coagulated at 85° C. and aged at 92° C. At this time, the coagulated material lumped together and was thus insufficiently dried, and some dried products were in the form of lumps which are impossible to extrude.

TABLE 1

| Example. No. | Notch izod impact strength (kgcm/cm, ASTM D256) | Gloss (45°, %) | Whiteness | Flowability (g/min, ASTM D1238) |
|---|---|---|---|---|
| Ex. 1 | 38 | 100 | 57 | 22 |
| Comp. Ex. 1 | 40 | 81 | 60 | 18 |
| Comp. Ex. 2 | 37 | 101 | 45 | 23 |
| Comp. Ex. 3 | 39 | 100 | 50 | 22 |
| Comp. Ex. 4 | 12 | 103 | 57 | 20 |
| Comp. Ex. 5 | 41 | 65 | 55 | 16 |
| Comp. Ex. 6 | 41 | 92 | 54 | 23 |
| Comp. Ex. 7 | 24 | 50 | 62 | 25 |
| Comp. Ex. 8 | 29 | 63 | 42 | 17 |

Ex.: Example
Comp. Ex.: Comparative Example

INDUSTRIAL APPLICABILITY

As apparent from the fore-going, the thermoplastic ABS resin prepared by the method of the present invention exhibits superior physical properties such as impact resistance, chemical resistance, and formability as well as excellent gloss and whiteness.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for preparing an acrylonitrile-butadiene-styrene (ABS) based thermoplastic resin comprising:
  (A) emulsion-polymerizing butadiene monomer to prepare a rubber latex having an average particle diameter of 1,800 Å to 5,000 Å, a polymerization conversion ratio of at least 90%, a swelling index of 12 to 40, and an average gel content of 70 to 95%;
  (B) emulsion-polymerizing 45 to 75 parts by weight of the rubber latex with 17 to 40 parts by weight of styrene and 4 to 20 parts by weight of acrylonitrile to prepare an acrylonitrile-butadiene-styrene (ABS) graft copolymer latex; and
  (C) coagulating the acrylonitrile-butadiene-styrene (ABS) graft copolymer latex with a coagulant at 60 to 80° C., followed by aging at 80 to 99° C., to obtain an acrylonitrile-butadiene-styrene (ABS) graft copolymer powder, wherein the step of preparing the rubber latex comprises:
  (i) introducing 50 to 95 parts by weight of the butadiene monomer, out of a total of 100 parts by weight thereof, together with 0.1 to 0.5 parts by weight of a molecular weight controlling agent to perform a primary reaction; and
  (ii) introducing 0.1 to 0.3 parts by weight of the molecular weight controlling agent together with 5 to 50 parts by weight of the remaining content of butadiene monomer to perform a secondary reaction,
  wherein a ratio of the molecular weight controlling agent to butadiene monomer to the molecular weight controlling agent used in the secondary reaction is higher than that used in the primary reaction, and a reaction time of the secondary reaction is longer than that of the primary reaction.

2. The method according to claim 1, wherein the coagulation is carried out by adding an aqueous sulfuric acid solution, an aqueous magnesium sulfate solution or a mixture thereof to the acrylonitrile-butadiene-styrene (ABS) graft copolymer latex.

3. The method according to claim 1, wherein the acrylonitrile-butadiene-styrene (ABS) graft copolymer powder has a bulk density ranging from 0.3 to 0.55.

4. The method according to claim 1,
  wherein in the step of preparing the rubber latex, an ethylene-based unsaturated compound copolymerizable with the butadiene monomer is further added,
  wherein the ethylene-based unsaturated compound is added in an amount not more than 20 parts by weight, with respect to 100 parts by weight of the total monomer mixture.

5. The method according to claim 4, wherein the ethylene-based unsaturated compound is at least one selected from the group consisting of aromatic vinyl compounds, vinyl cyanide compounds and combinations thereof.

6. The method according to claim 1, wherein the primary reaction is carried out by simultaneously introducing 50 to 95 parts by weight of the butadiene monomer, out of a total of 100 parts by weight thereof, 1 to 4 parts by weight of an emulsifier, 0.2 to 1.5 parts by weight of a polymerization initiator, 0.1 to 0.5 parts by weight of an electrolyte, 0.1 to 0.5 parts by weight of a molecular weight controlling agent, and 75 parts by weight of ion exchanged water, following by reacting at 60 to 75° C. for 8 to 25 hours, and
  the secondary reaction is carried out by simultaneously, continuously or sequentially introducing 5 to 50 parts by weight of the remaining content of the butadiene monomer and 0.1 to 0.3 parts by weight of a molecular weight controlling agent, followed by reacting at 70 to 85° C. for 15 to 40 hours.

7. The method according to claim 1, wherein the rubber latex has a polymerization conversion ratio of at least 93% and an average gel content of at least 88%.

8. The method according to claim 1, wherein the step of preparing the acrylonitrile-butadiene-styrene (ABS) graft copolymer latex comprises:
  (iii) continuously or intermittently adding 0.1 to 0.5 parts by weight of an oil-soluble initiator, 11 to 25 parts by weight of styrene and 3 to 16 parts by weight of acrylonitrile, to 45 to 75 parts by weight of the rubber latex, to perform primary graft polymerization; and
  (iv) continuously or intermittently adding 6 to 15 parts by weight of styrene and 1 to 4 parts by weight of acrylonitrile to the primary graft polymer, to perform secondary graft polymerization.

9. The method according to claim 8, wherein the oil-soluble polymerization initiator is selected from the group consisting of cumene hydroperoxide, diisopropylbenzene hydroperoxide, azobisisobutyronitrile, tert-butyl hydroperoxide, p-methane hydroperoxide, benzoylperoxide and mixtures thereof.

10. The method according to claim 8, wherein the preparation of the acrylonitrile-butadiene-styrene (ABS) graft copolymer latex is carried out at a temperature of 45 to 80° C.

11. The method according to claim 8, wherein the solid content measured after the completion of the acrylonitrile-butadiene-styrene (ABS) graft copolymerization is 0.7% or less.

12. The method according to claim 1, further comprising:
mixing the acrylonitrile-butadiene-styrene (ABS) graft copolymer powder with a styrene-acrylonitrile (SAN) copolymer prepared by bulk polymerization.

13. A method for preparing a rubber latex with an average particle diameter of 1,800 Å to 5,000 Å, a polymerization conversion ratio of at least 93%, a swelling index of 12 to 40, and an average gel content of at least 88%, by emulsion polymerizing a conjugated diene compound monomer, the method comprising:
(A) introducing 50 to 95 parts by weight of the conjugated diene compound monomer, out of a total of 100 parts by weight thereof, together with 0.1 to 0.5 parts by weight of a molecular weight controlling agent to perform a primary reaction; and
(B) introducing 0.1 to 0.3 parts by weight of the molecular weight controlling agent together with 5 to 50 parts by weight of the remaining content of the conjugated diene compound monomer,
wherein a ratio of the molecular weight controlling agent to the conjugated diene compound monomer to the molecular weight controlling agent used in the secondary reaction is higher than that used in the primary reaction, and a reaction time of the secondary reaction is longer than that of the primary reaction.

14. The method according to claim 13, wherein the primary reaction is carried out by simultaneously introducing to 95 parts by weight of the conjugated diene compound monomer, out of a total of 100 parts by weight thereof, 1 to 4 parts by weight of an emulsifier, 0.2 to 1.5 parts by weight of a polymerization initiator, 0.1 to 0.5 parts by weight of an electrolyte, 0.1 to 0.5 parts by weight of a molecular weight controlling agent, and 75 parts by weight of ion exchanged water, following by reacting at 60 to 75° C. for 8 to 25 hours, and
the second reaction is carried out by simultaneously, continuously or sequentially introducing 5 to 50 parts by weight of the remaining content of the conjugated diene compound monomer and 0.1 to 0.3 parts by weight of a molecular weight controlling agent, followed by reacting at 70 to 85° C. for 15 to 40 hours.

15. The method according to claim 6, wherein the emulsifier is selected from the group consisting of alkylaryl sulfonate, alkali metal alkyl sulfate, sulfonated alkylester, fatty acid soaps, alkali metal rosinates and mixtures thereof.

16. The method according to claim 6, wherein the electrolyte is selected from the group consisting of KCl, NaCl, $KHCO_3$, $NaHCO_3$, $K_2CO_3$, $Na_2CO_3$, $KHSO_3$, $NaHSO_3$, $K_4P_2O_7$, $Na_4P_2O_7$, $K_3PO_4$, $Na_3PO_4$, $K_2HPO_4$, $Na_2HPO_4$ and mixtures thereof.

17. The method according to claim 8, wherein an emulsifier is further added in the step of preparing the acrylonitrile-butadiene-styrene (ABS) graft copolymer latex and the emulsifier is selected from the group consisting of alkylaryl sulfonate, alkali metal alkyl sulfate, sulfonated alkylester, fatty acid soaps, alkali metal rosinates and mixtures thereof.

18. The method according to claim 14, wherein the conjugated diene compounds is at least one selected from the group consisting of 1,3-butadiene, isoprene, chloroprene and piperylene.

19. The method according to claim 14, wherein the emulsifier is selected from the group consisting of alkylaryl sulfonate, alkali metal alkyl sulfate, sulfonated alkylester, fatty acid soaps, alkali metal rosinates and mixtures thereof.

20. The method according to claim 14, wherein the electrolyte is selected from the group consisting of KCl, NaCl, $KHCO_3$, $NaHCO_3$, $K_2CO_3$, $Na_2CO_3$, $KHSO_3$, $NaHSO_3$, $K_4P_2O_7$, $Na_4P_2O_7$, $K_3PO_4$, $Na_3PO_4$, $K_2HPO_4$, $Na_2HPO_4$ and mixtures thereof.

* * * * *

UNITED STATES PATENT AND TRADEMARK OFFICE
CERTIFICATE OF CORRECTION

PATENT NO.        : 8,299,175 B2                                              Page 1 of 1
APPLICATION NO.   : 12/290924
DATED             : October 30, 2012
INVENTOR(S)       : Keun-hoon Yoo et al.

It is certified that error appears in the above-identified patent and that said Letters Patent is hereby corrected as shown below:

In the Specification
Column 2, line 16, "an" should read -- a --.

In the Claims
Claim 14, Column 15, line 37, "introducing to 95" should read -- introducing 50 to 95 --.
Claim 18, Column 16, line 27, "compounds" should read -- compound --.

Signed and Sealed this
Sixth Day of January, 2015

Michelle K. Lee
*Deputy Director of the United States Patent and Trademark Office*